(12) United States Patent
Dowel

(10) Patent No.: US 11,034,104 B2
(45) Date of Patent: Jun. 15, 2021

(54) APPARATUS FOR SEALING AND INFLATION OF DAMAGED INFLATABLE ARTICLES, SUCH AS PUNCTURED TIRES

(71) Applicant: TRYDEL RESEARCH PTY LTD, Victoria (AU)

(72) Inventor: Terence Dowel, Victoria (AU)

(73) Assignee: TRYDEL RESEARCH PTY LTD, Victoria (AU)

( * ) Notice: Subject to any disclaimer, the term of this patent is extended or adjusted under 35 U.S.C. 154(b) by 104 days.

(21) Appl. No.: 15/999,246

(22) PCT Filed: Feb. 15, 2017

(86) PCT No.: PCT/AU2017/050126
§ 371 (c)(1),
(2) Date: Aug. 17, 2018

(87) PCT Pub. No.: WO2017/139837
PCT Pub. Date: Aug. 24, 2017

(65) Prior Publication Data
US 2020/0086595 A1    Mar. 19, 2020

(30) Foreign Application Priority Data
Feb. 17, 2016    (AU) ................................ 2016900554

(51) Int. Cl.
*B29C 73/16*    (2006.01)
*B29L 30/00*    (2006.01)

(52) U.S. Cl.
CPC ......... *B29C 73/166* (2013.01); *B29L 2030/00* (2013.01)

(58) Field of Classification Search
CPC ........................... B29C 73/166; B29L 2030/00
(Continued)

(56) References Cited

U.S. PATENT DOCUMENTS 5,427,145 A * 6/1995 Grabenkort ......... A61M 16/183
128/203.12
6,964,284 B2   11/2005 Eckhardt
(Continued)

FOREIGN PATENT DOCUMENTS

CN    103802795    5/2014
EP     2261011    12/2010
(Continued)

OTHER PUBLICATIONS

Supplementary European Search Report dated Sep. 20, 2019 in European Patent Application No. 17752562.3, 8 pages.
(Continued)

*Primary Examiner* — Hadi Shakeri
(74) *Attorney, Agent, or Firm* — Maschoff Brennan

(57) ABSTRACT

An apparatus for repairing and/or inflating a damaged and/or deflated inflatable article, such as a punctured and/or flat tire, includes a container for receiving and retaining for dispensing, a sealant composition and a compressor assembly which is releasably connectable to the container. The container has associated therewith a valve assembly which allows for controlled dispensing of the sealant composition from the container to the damaged and/or deflated inflatable article. The container is progressively and selectively movable between respective first and second positions/configurations. In the first position/configuration, the container is disposed substantially parallel to the compressor assembly and in the second position/configuration the container is disposed at substantially right angles to the compressor assembly. The first and second positions/configurations correspond to storage and dispensing positions respectively for the sealant composition from the container.

27 Claims, 15 Drawing Sheets

(58) Field of Classification Search
USPC .......................................................... 81/15.2
See application file for complete search history.

(56) References Cited

U.S. PATENT DOCUMENTS

| | | | |
|---|---|---|---|
| 8,640,744 B2* | 2/2014 | Dowel | F16K 17/0406 |
| | | | 141/38 |
| 9,956,730 B2* | 5/2018 | Kono | F04B 39/0094 |
| 2003/0056851 A1 | 3/2003 | Eriksen et al. | |
| 2004/0159365 A1 | 8/2004 | Cowan et al. | |
| 2005/0056358 A1 | 3/2005 | Eriksen et al. | |
| 2008/0029181 A1 | 2/2008 | Marini | |
| 2010/0101375 A1* | 4/2010 | Yoshida | B60S 5/043 |
| | | | 81/15.6 |
| 2010/0108186 A1 | 5/2010 | Yoshida et al. | |
| 2011/0155280 A1 | 6/2011 | Eckhardt et al. | |
| 2011/0192492 A1* | 8/2011 | Kanenari | B29C 73/166 |
| | | | 141/38 |
| 2011/0290372 A1 | 12/2011 | Dowel et al. | |
| 2014/0209207 A1 | 7/2014 | Spindler et al. | |
| 2018/0333927 A1* | 11/2018 | Spindler | B29C 73/166 |

FOREIGN PATENT DOCUMENTS

| | | |
|---|---|---|
| JP | 2011098461 A | 5/2011 |
| WO | 2017/085695 | 5/2017 |

OTHER PUBLICATIONS

International Search Report dated May 5, 2017 in related PCT Application No. PCT/AU2017/050126.

\* cited by examiner

APPARATUS FOR SEALING AND INFLATION OF DAMAGED INFLATABLE ARTICLES, SUCH AS PUNCTURED TIRES

The present invention relates, in general terms, to an improved apparatus for use in the sealing/resealing and subsequent re-inflation of a damaged inflatable article, as for example a punctured or flat tire (tyre) for a vehicle. The invention relates more particularly, but not exclusively, to an improved apparatus in the form of a kit which includes as principal components a supply/container of a fluid which is capable of resealing/repairing such a damaged tire to allow for subsequent re-inflation thereof, and a means for injection of such fluid into the damaged tire as well as for injection of air to allow for re-inflation thereof.

BACKGROUND

Wheeled vehicles of any given type are subject to puncturing of one or more wheels. Once a puncture occurs, the pressure within the tire (tyre) will decrease, either drastically or progressively dependent upon the nature and location of the puncture such that, within a finite period, the relevant tire is no longer suitable for use and is not capable of properly supporting the relevant vehicle.

When such a situation arises it becomes necessary for the damaged/deflated tire to be either repaired on the spot, to allow for subsequent re-inflation and re-use, or in the alternative to be actually removed from the vehicle and replaced by what is commonly referred to as the spare tire, to allow for repair of the damaged tire at a later date.

Regardless of which of these two alternatives is followed, the object is to restore the vehicle to a usable condition in the shortest possible time and with the least possible effort.

In recent years there have been a number of attempts made at providing an apparatus of this general type. One of these is disclosed in the present Applicant's U.S. Pat. No. 8,640,744. The present invention seeks to provide an improvement over the apparatus of that United States patent by providing an apparatus, in kit form, which is compact and hence able to be readily stored when not in use, yet is extremely simple to operate, with little physical effort required on the part of the operator. As such, an apparatus in accordance with the present invention lends itself to ready use, regardless of the age, sex and/or physical capabilities of the proposed user.

It is a preferred object of the present invention to provide an apparatus for the sealing/resealing and subsequent re-inflation of a damaged and/or deflated inflatable article, in particular a punctured and/or flat tire, which substantially overcomes, if not removes altogether the problems and disadvantages associated with the prior art and/or provides a useful commercial alternative.

SUMMARY

The invention provides a simple method of, and apparatus for, sealing or repairing, and then re-inflating, a punctured tire. The apparatus in accordance with the present invention, in the form of a kit, is intended to overcome drawbacks and disadvantages associated with existing methods and apparatus. The kit in accordance with the present invention is compact (which lends itself to easy storage when not in use), fully reusable and extremely simple and effective to operate.

In accordance with one aspect of the present invention, but not necessarily the broadest aspect, there is provided an apparatus for the repairing and/or inflating of a damaged and/or deflated inflatable article, such as a punctured and/or flat tire, said apparatus including:
a container for receiving and retaining for dispensing, a sealant composition; and
a compressor assembly which is releasably connectable to said container:
wherein said container has associated therewith a valve assembly which allows for controlled dispensing of said sealant composition from said container to said damaged and/or deflated inflatable article, and wherein said container is progressively and selectively movable between respective first and second positions/configurations, said first position/configuration when disposed substantially parallel to said compressor assembly, and said second position/configuration when disposed at substantially right angles to said compressor assembly, said first and second positions/configurations corresponding to storage and dispensing positions respectively for said sealant composition from said container.

The arrangement is such that, when the container for said sealant composition is in its first, storage position or configuration, then actuation of the compressor will only allow for air to be dispensed from the valve assembly. On the other hand, when that same container is pivoted to its second, in some instances upright dispensing position, activation of the compressor will result in dispensing of sealant composition and air, to be injected into the tire or the like inflatable article.

Suitably, said container includes a main body portion which is closed at one end and has a neck portion extending substantially normally from the other, open end thereof, said neck portion of said container being adapted, in use, to receive and releasably retain said valve assembly.

Suitably, said valve assembly is releasably disposed within said neck portion of said container and is adapted to be in flow connection with said compressor assembly.

Suitably, said compressor assembly has associated therewith means allowing for connection to a source of power, said connection means being in the form of a retractable cord or power conduit, said cord or conduit having, at one end thereof, adaptor means allowing for connection to a source of electrical energy/power.

Suitably, said valve assembly has associated therewith a connector assembly including a pivoting or hinging member having a first hollow tube and a second hollow tube associated therewith and extending transversely of a closed end of said connector assembly.

Suitably, the apparatus includes a pair of nipples extending laterally from opposed sides of respective dividers of a case for housing said apparatus, a first of said pair of nipples allowing for releasable connection to said compressor assembly and a second of said pair of nipples allowing for releasable connection to a hose, in turn to be releasably connected to said inflatable article.

Preferably, actuation of said compressor when said container is in said first position/configuration allows air flow through the first hollow tube for inflation or re-inflation of said inflatable article.

Preferably, actuation of said compressor when said container is in said second position/configuration allows air flow through said second hollow tube for dispensing a mixture of air and sealant composition from said container to said inflatable article.

In some embodiments, a connector assembly associated with said valve assembly includes a main body adapted to be releasably connected to said neck portion of said container.

Suitably, said main body of said connector assembly includes a first passageway extending axially thereof, said first passageway terminating, at one end, with means allowing for releasable connection to said compressor assembly.

Suitably, said connector assembly includes a second passageway, in use to be in flow connection with a lateral substantially tubular extension of said main body of said connector assembly, wherein said lateral extension includes means allowing for releasable connection to a hose, in turn to be releasably connected to said inflatable article.

Further aspects and/or features of the present invention will become apparent from the following description.

BRIEF DESCRIPTION OF THE DRAWINGS

In order that the invention may be more clearly understood and put into practical effect reference will now be made to a preferred embodiment of an apparatus in accordance with the present invention. The ensuing description is given by way of non-limitative example only and is with reference to the accompanying drawings wherein.

DETAILED DESCRIPTION

Figure 1:
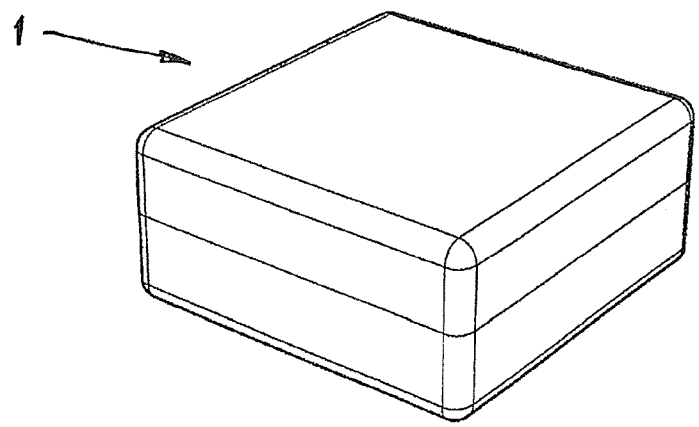
FIG. 1 is a top perspective view of an apparatus in accordance with the present invention, in its storage configuration.

As shown in the drawings the present invention provides, in a compact manner and stored within a case generally designated 1, the apparatus needed to prepare and reseal a damaged or deflated inflatable article, that is for example a vehicle tire (tyre). To be located or held within the case 1, in a compact and readily accessible manner, are the principal components of the kit or apparatus, namely a container 100 for receiving and releasably retaining, for dispensation as and when necessary, a supply of a sealant composition of any suitable type, said container 100 having associated therewith a valve assembly 200, a compressor 300, an adaptor 400 intended, in use, to be inserted into the cigarette lighter outlet or an equivalent power outlet of the vehicle, such being an electrical connection with the compressor 300, a hose 500 to be, in use, connected to the tire valve, and a connector assembly 600 to which the container 100 and associated valve assembly 200 are to be connected. In this embodiment, all these components, to be described in more detail hereinafter, are housed within compartments of the case 1 formed by appropriately-shaped dividers, which may be either formed integrally with the case or, in the alternative, adapted in use to be removably and selectively located therein.

In accordance with the invention the container 100 for sealant composition is to be, preferably, in threaded connection with the connector assembly 600. The arrangement, put simply, is that when the container 100 is lying flat (see for example FIGS. 2 and 3), and parallel to the compressor 300, it is not possible for sealant composition to exit the container 100. On the other hand, when the container 100 is pivoted or swivelled through 90°, to the position shown for example in FIG. 4, the compressor 300 can then be activated to cause sealant composition to exit the container 100.

Figure 2:
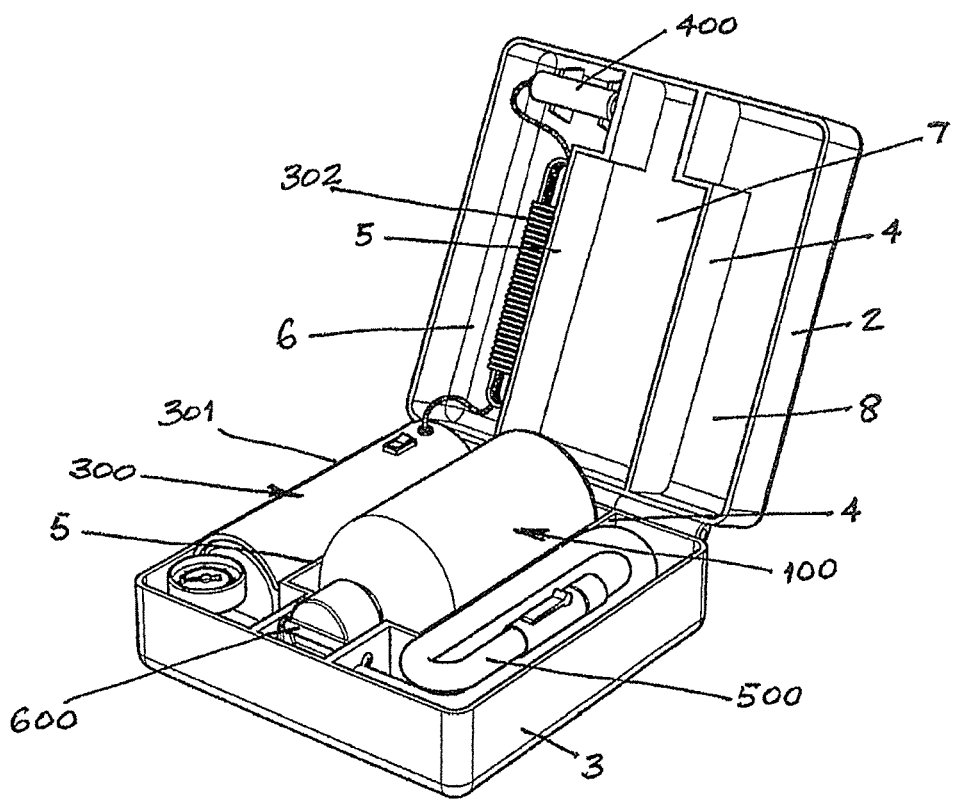
FIG. 2 is a top perspective view of the apparatus of FIG. 1, with a case of the apparatus opened to allow for usage of the contents thereof.
Figure 3:
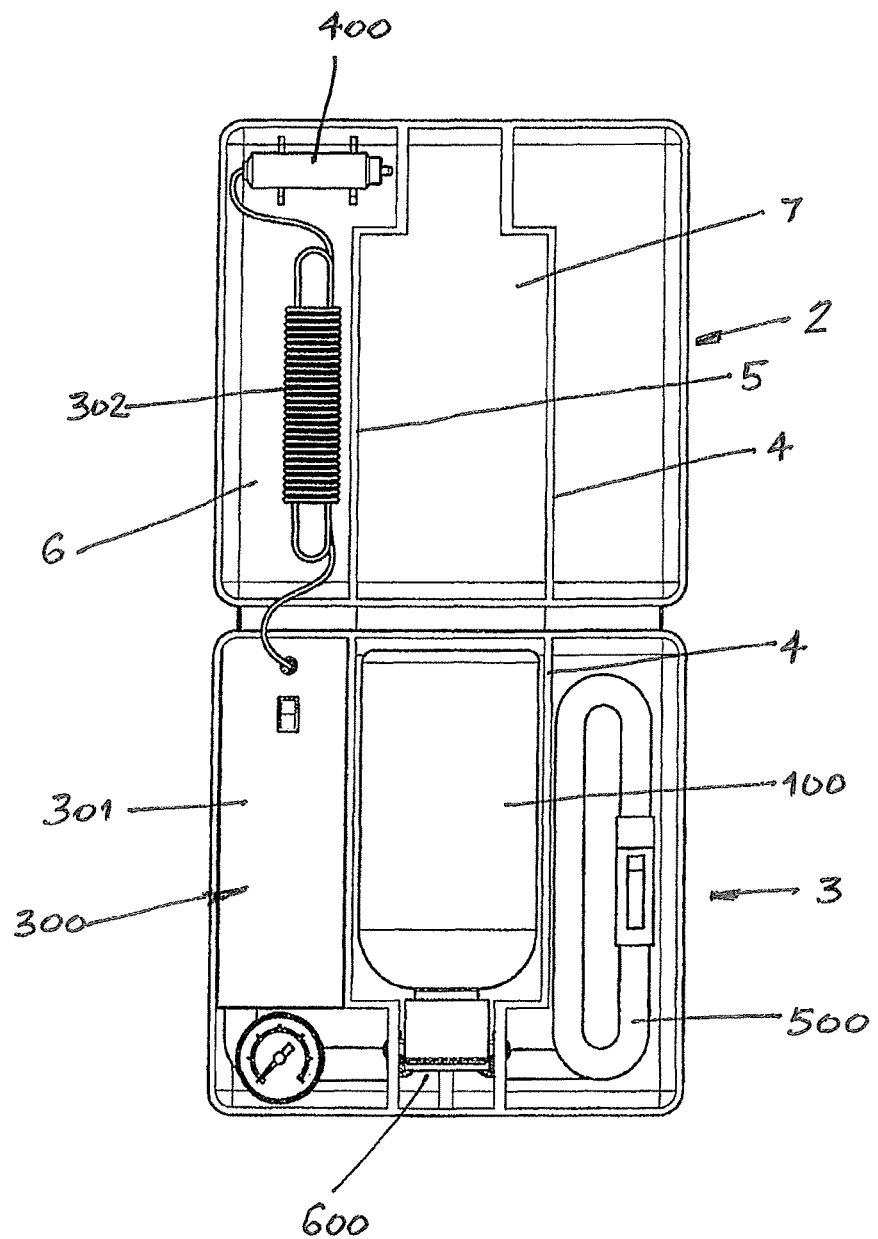
FIG. 3 is a top view of the apparatus of FIG. 1, showing the various components in their stored locations in the case.

As best shown in FIGS. 2 and 3 the case 1 includes respective top and bottom sections 2 and 3 hingedly, (or in any known manner) connected one to the other, each having shaped dividers 4 and 5 located therein. The dividers 4, 5 serve to separate the sections 2, 3 into three separate and distinct compartments 6, 7 and 8, a first compartment 6 for housing the compressor 300 and adaptor 400, a second or middle compartment 7 for housing the container 100 with associated valve assembly 200 and connector assembly 600, and the third compartment 8 for housing the hose 500 and valve connector.

The container 100 for sealing fluid may be constructed from any suitable material, and more preferably from a plastics material, and may be of any suitable shape. In the preferred embodiment illustrated such container 100 is in the form of a substantially cylindrical bottle having a main body portion 101 and a neck portion 102 extending from one end thereof and substantially normally thereto, with that neck portion 102 preferably including a plurality of external threads 103 extending along at least part of the axial dimension thereof. The container 100 is intended to house, for dispensing as and when required, a sealant or repair fluid of the type described and defined in, for example the present Applicant's International (PCT) Application No. PCT/AU2008/001499 or PCT/AU2007/001222, or Australian Patent No. 2009905952. It should be understood however, that neither the material of construction of the container 100, nor the actual composition of the repair/sealant composition to be housed therein, constitute part of the present invention.

When not in use, and in its storage position, the container 100 will lie flat in the case 1, located between dividers 4 and 5 and in the second or middle compartment 7, as shown for example in FIG. 2 and FIG. 3. On the other hand, when it becomes necessary to use the kit or apparatus in accordance with the present invention, the container 100 is adapted to be moved (as by pivoting) to an upright position, relative to the bottom section 3 of the case 1, and as shown for example in FIG. 4. When in the storage position, the valve assembly 200 in accordance with the invention serves to prevent leakage of fluid from the container 100. On the other hand, when in the upright or active condition or position, that valve assembly 200 allows, in a manner to be described in more detail hereinafter, air to enter the container 100 and to be mixed with the fluid stored therein, with the mixture of air and fluid then exiting through the valve assembly 200 into a hose 500 for injection into the vehicle's damaged tire, via the tyre valve, to allow for repair of that tire. Continued operation of the compressor 300, once the fluid is injected, allows for eventual re-inflation for re-use of that vehicle tire.

Turning now to the compressor assembly 300, such is preferably in the form of a shaped container 301 which serves as a housing for a compressor and associated equipment. Preferably the container 301 includes a main body section, of a substantially cylindrical shape. The container 301 includes, housed there within, a compressor, motor or the like for operation thereof, and means allowing for connection of said compressor, motor or the like to a suitable power source. In the especially preferred embodiment illustrated such will take the form of a cord or electrical conduit 302, with the cord 302 having associated therewith at the free or external end thereof an adaptor or connector 400, of any known type, which in use can be releasably connectable to a cigarette lighter outlet or the equivalent power outlet of the vehicle, whereby to allow for activation/operation of the motor, and hence the compressor, as and when required.

The arrangement may include means allowing for retraction of the conduit 302 when not in use. The means for extraction/retraction of the cord 302 are not of the essence of the invention.

Figure 13:
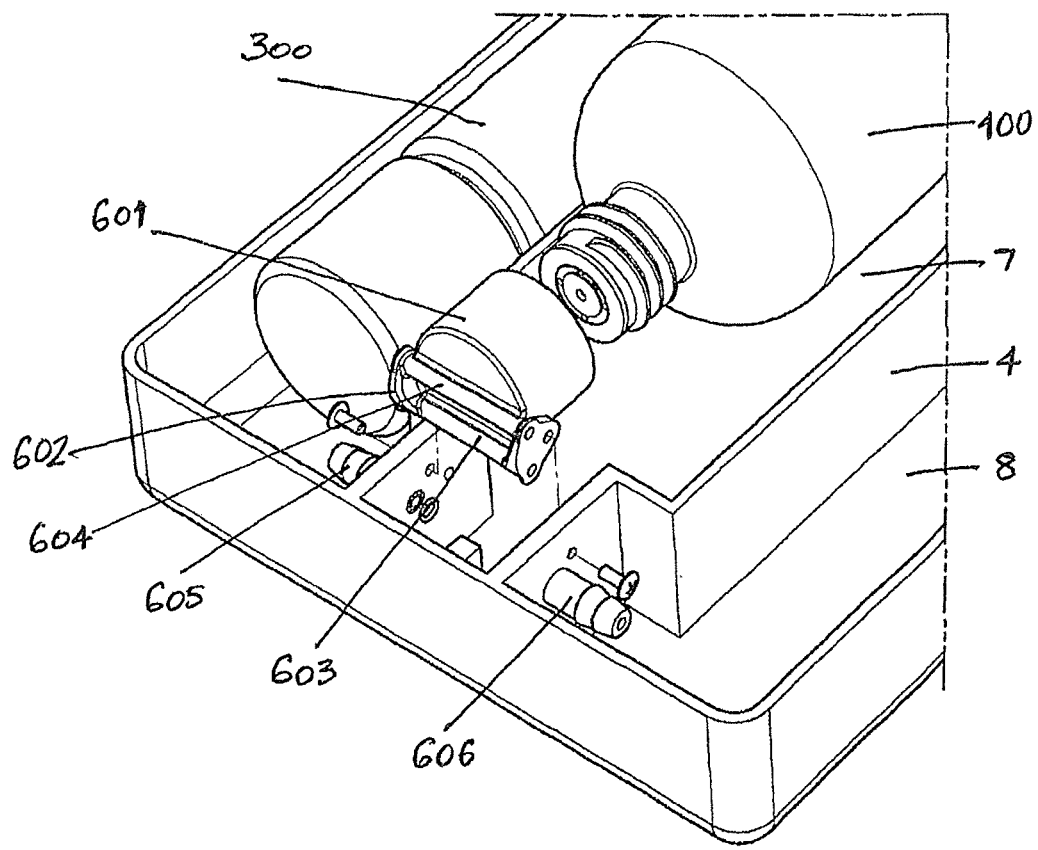
FIG. 13 is a top perspective view of an end of the apparatus in accordance with the present invention, showing the container separated from the valve assembly.
Figure 14:
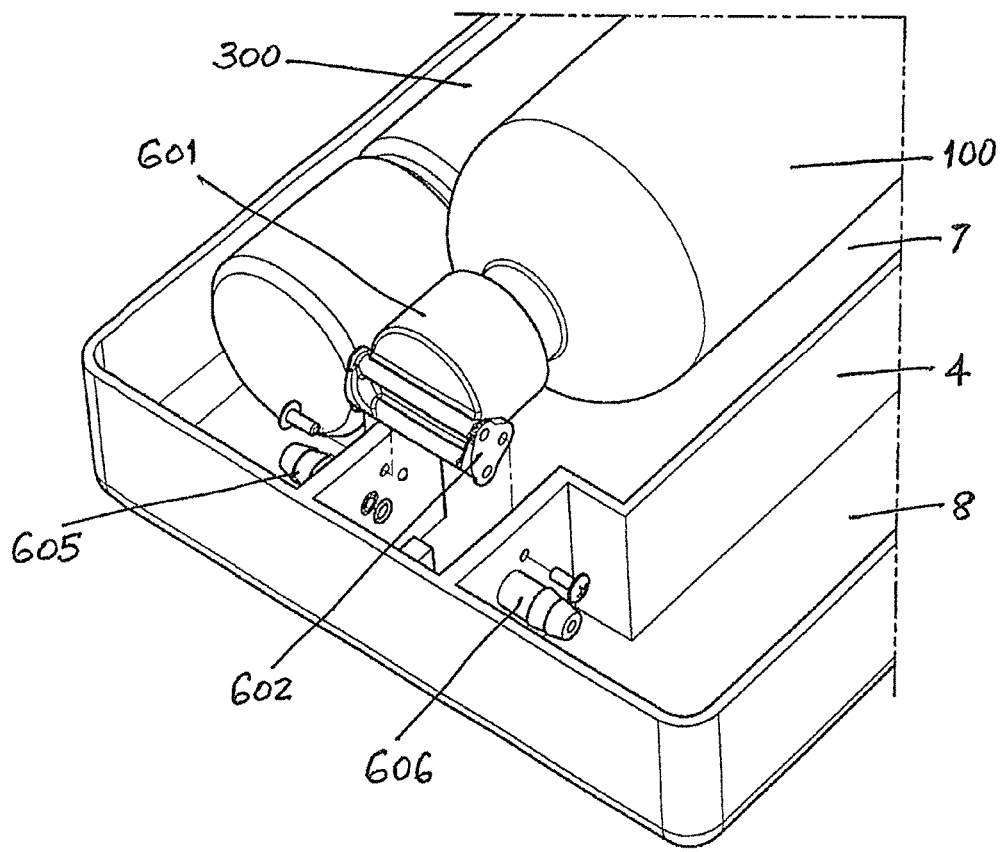
FIG. 14 is a view similar to FIG. 13, but showing the container in a position connected to the valve assembly.
Figure 15:
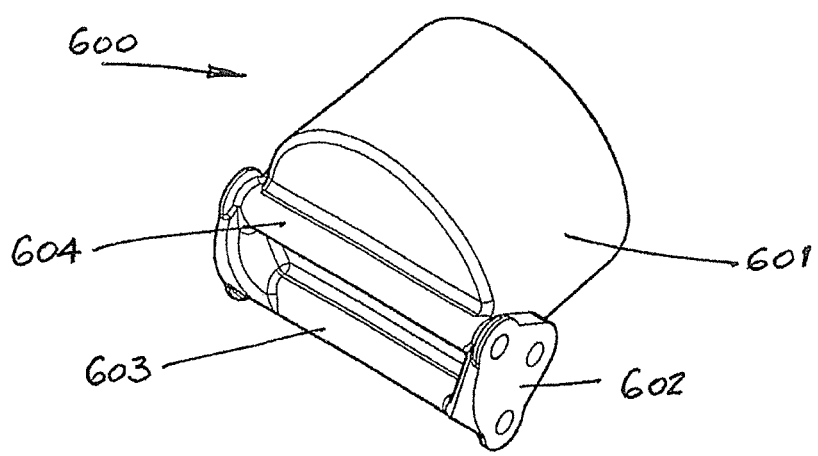
FIG. 15 is a top perspective view of the valve assembly of the apparatus in accordance with the present invention.

The second or middle compartment 7 of the bottom section 3 of case 1 includes, at one end thereof, a portion of lesser width which is adapted, in use, to have releasably located therein the connector assembly 600. The connector assembly 600 includes, as principal components, a substantially cylindrical member 601, open at one end and closed at the other, such being releasably affixable to a pivoting or hinging member 602 having a pair of hollow tubes including first hollow tube 603 and second hollow tube 604 associated therewith and extending transversely of the closed end thereof. The first hollow tube 603 does not provide fluid communication with the valve assembly 200 whereas the second hollow tube 604 allows fluid communication with the valve assembly 200. As shown for example in FIGS. 13 and 14 that portion of lesser width of the middle compartment 7 of the case base or bottom section 2 has associated therewith, and extending laterally from opposed sides thereof, nipples 605 and 606 respectively, nipple 605 to allow for releasable connection to the compressor 300, with nipple 606 then allowing for releasable connection to the hose 500. The pivoting or hinging member 602 is adapted, in use, to be located within the portion of lesser width and transversely thereof, in any known manner and using any known methods, as for example pop-rivet 607 or some other form of fixing means.

As shown in, for example, FIGS. 7 to 12, the valve assembly 200 is adapted, in use, to be located within the neck portion 102 of the container 100. To that end the main body 201 of the valve assembly 200 may preferably have a plurality of threads 202, of a complimentary shape to the threads 103 of the container 100, extending along at least part of the axial dimension thereof. The main body 201 of the valve assembly is adapted in use to be associated with the neck portion 102 of the container 100, with the interposition of an insert 203, which may be constructed of any suitable material, as for example a plastics material. The main body 201 of the valve assembly 200 has extending there through, and preferably substantially centrally thereof, a passage 204.

The main body 201 includes a shaped indent adapted to receive, and releasably retain, suitable sealing means, as for example O-ring type seal 205.

The main body 201 further includes, sited substantially centrally thereof and extending axially thereof, a hollow member 206 in flow connection with the passage 204. The hollow member 206 is sealed at the uppermost end thereof by, suitable sealing means, as for example, an O-ring type seal 207.

When the compressor 300 is actuated, air commences to flow via suitable hosing, and then through the nipple 605. If the container 100 is in the horizontal or storage position, as in FIG. 1 for example, such air will be directed through first hollow tube 603 to hose 500 which, if connected to the vehicle tyre, will allow for inflation, or re-inflation thereof. When in this position air cannot be directed to the container 100.

Figure 7:
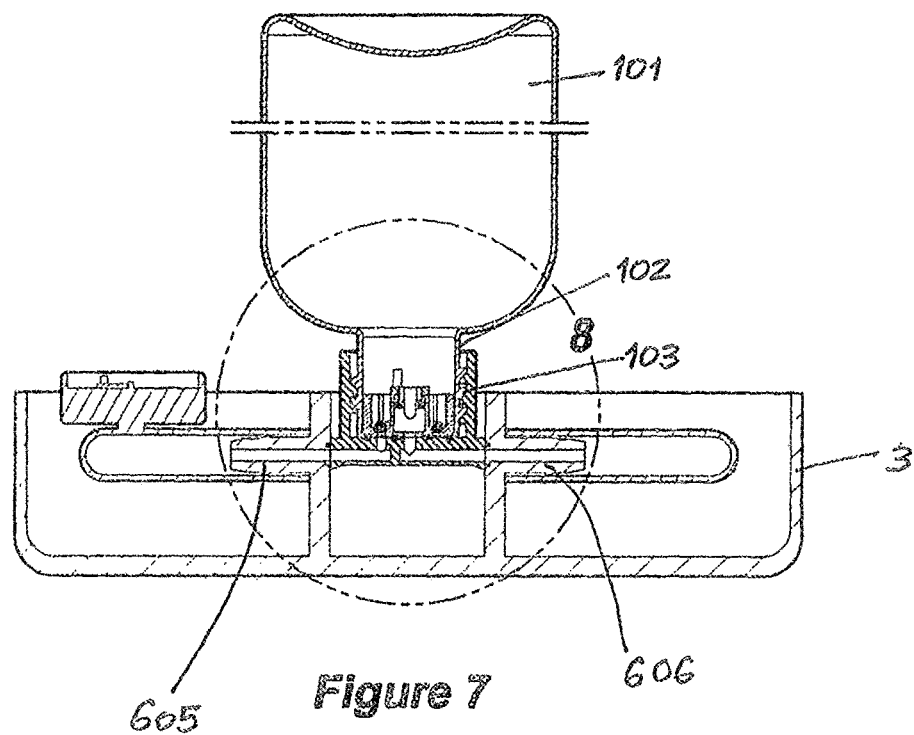
FIG. 7 is an end view in section of the apparatus of FIG. 6, taken along the line 7-7 thereof.
Figure 8:
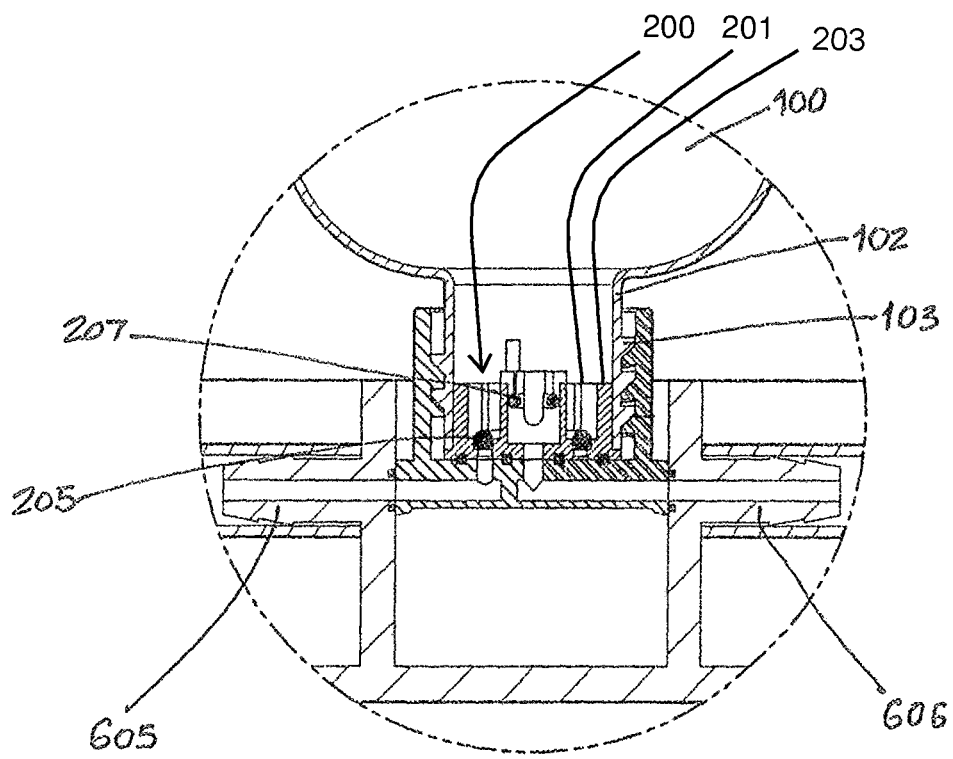
FIG. 8 is an enlarged sectional view taken along the apparatus of FIG. 7.
Figure 9:
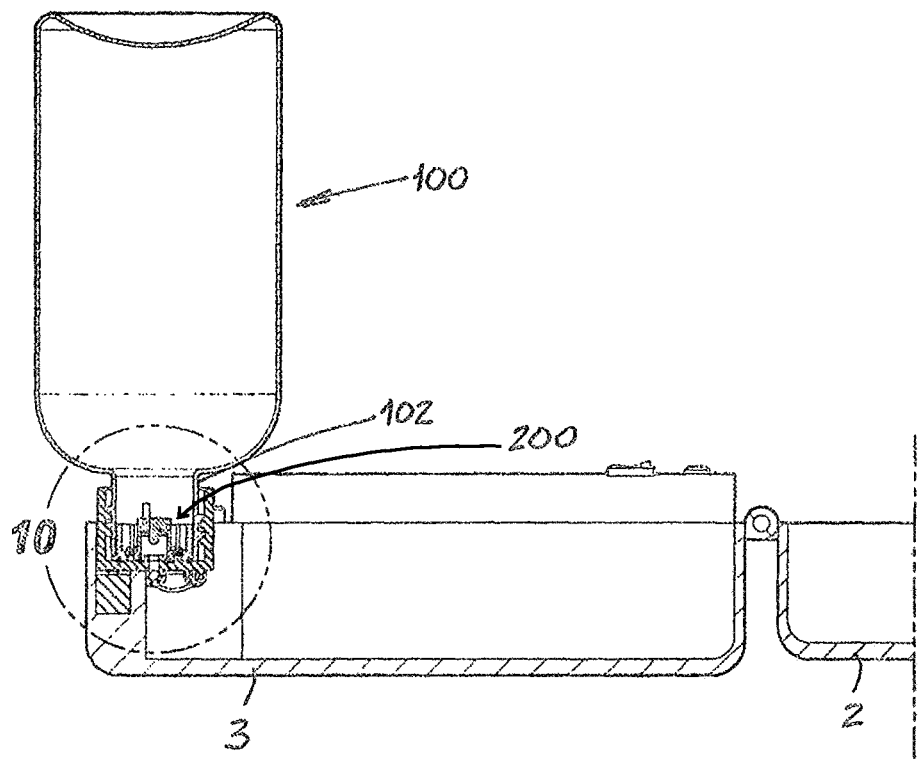
FIG. 9 is a side sectional view of the apparatus in accordance with the present invention, with the container for fluid, such as sealant composition in its upright dispensing configuration.
Figure 10:
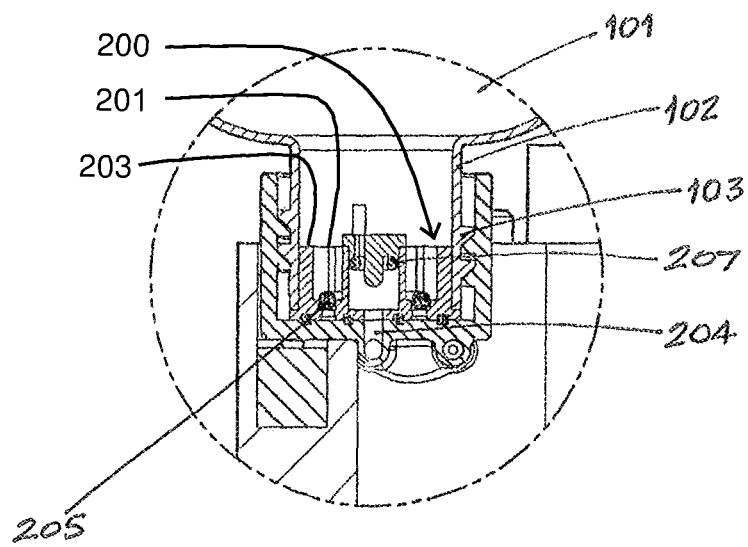
FIG. 10 is an enlarged view of the valve assembly of FIG. 9.
Figure 11:
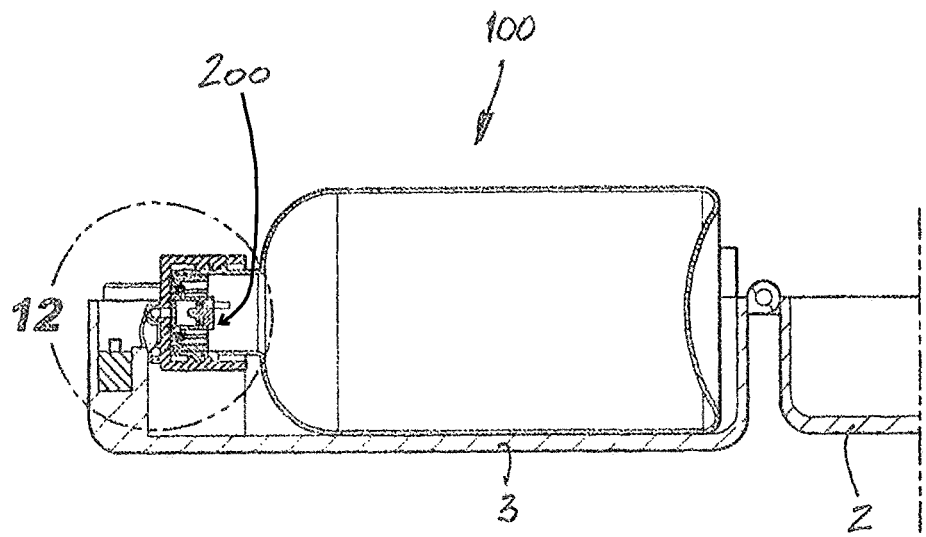
FIG. 11 is a view, similar to FIG. 9, but showing the container in its horizontal or storage position/configuration.
Figure 12:
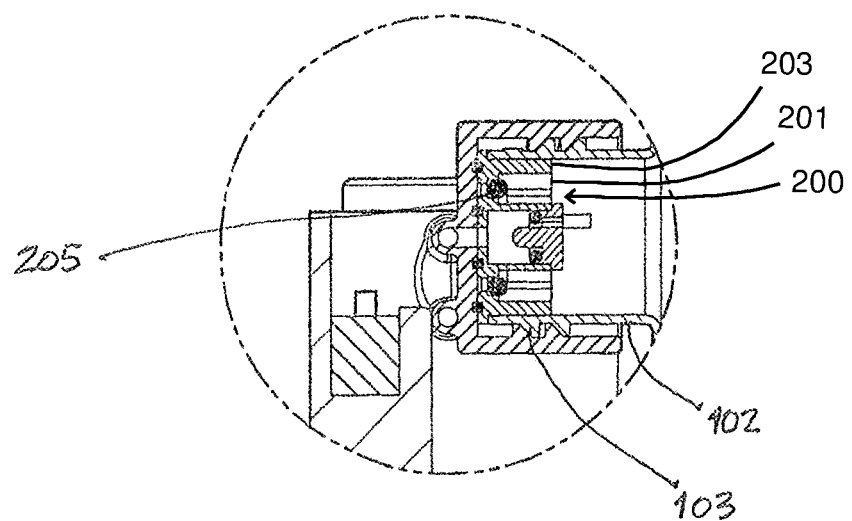
FIG. 12 is an enlarged view of the valve assembly of the container of FIG. 11.

When the container 100, however, has pivoted to its upright position, see for example FIG. 7, then it is the second hollow tube 604 of the connector assembly 600 which courses into flow connection with the nipple 605. As the compressor 300 continues to operate, the O-ring seal 205 will be forced relatively upwardly, to allow air exiting the compressor to flow into the container 100, to be mixed with the content thereof. As the procedure continues, then O-ring seal 207 is moved relatively downwardly, allowing a mixture of air and sealant composition to exit the container 100, then to travel into the second hollow tube 604 for passage, via nipple 606, into the hosing, and finally through the tyre valve into the tyre. Operation of the compressor 300 will continue until such time as, firstly, the content of the container 100 has been dispensed/injected into the tyre, and will continue until such time as the tyre is re-inflated to the desired pressure. If over-inflation happens to take place, interruption of operation of the compressor will allow for deflation of the tyre to the required desired pressure.

Figure 16:
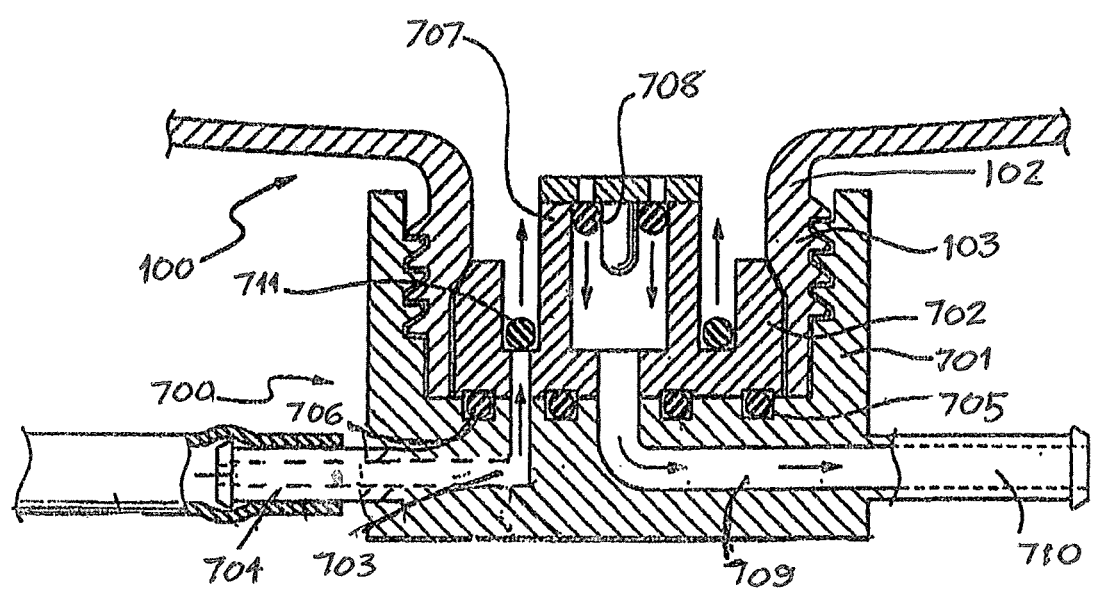
FIG. 16 is a schematic cross sectional representation of a further embodiment of a connector assembly in accordance with the present invention.

In similar manner to the earlier described embodiment, in the embodiment of FIG. 16 there is provided a connector assembly, generally designated 700, which includes a main body 701, preferably substantially cylindrical in shape. The arrangement is that the neck portion 102 of the container 100 is adapted in use to be associated with the main body 701 of the connector assembly 700, with the interposition of a shaped insert 702 which may be constructed of any suitable material, as for example a plastics material. The main body 701 has, extending longitudinally thereof, a first passageway 703 which, terminates in a means 704 adapted to receive, and releasably retain relative thereto, the hose or the like which extends from the compressor 300 housed within the case 1. The main body 701 further includes shaped indents or grooves 705 each adapted to receive and releasably retain there within a suitable sealing means, as for example an O-ring seal 706 or the like. Protruding substantially normally from the upper face of the main body 701 is a hollow extension 707 which is sealed at its uppermost end by a further suitable sealing means, as for example a further O-ring seal 708. In this embodiment, the hollow extension 707 forms part of the shaped insert 702 interposed between the connector assembly and the neck portion 102 of the container 100. The main body 701 includes a further or second passageway 709 terminating in a lateral, substantially tubular extension or outlet 710 adapted, in use, to be releasably connected with a hose or the like length of tubing 500 to be connected to the valve of a damaged inflatable article, in particular a tire.

Located at the top end of the passageway 703 is yet another O-ring seal 711, adapted to constitute a seal for said passageway 703. The compressor 300 housed within case 1 is in flow connection with the passageway 703. In use the lateral extension or outlet 710 is in flow connection with the damaged or flat tire.

When the compressor 300 is actuated, air commences to flow into the passageway 703. As pressure builds, the O-ring seal 711 will be moved from its seating, allowing air to flow via the passageway 711 into the container 100, to be mixed with the content thereof. As the compressor 300 continues to operate, the O-ring seal 708 will be forced relatively downwardly, in the direction of the arrow as shown, to allow the mixture of air and sealant composition to flow into the passageway 709, and from there via the outlet 710 and associated hose or tubing 500 to the tyre. Operation of the compressor 300 will be continued until such time as, firstly, the content of the container 100 has been dispensed/injected into the tire, and will continue until such time as the tire is re-inflated to the desired pressure (determined by reference to the pressure gauge 9).

An apparatus in accordance with the invention gives rise to a number of practical advantages when compared with known and in-use requirements.

Firstly, by being in a kit form, with all necessary relevant/components preferably provided interconnected, actual use or preparation for use is extremely simplified. Indeed all the user need do is:

(i) connect the hose 500 to the tire valve:
(ii) connect the compressor 300 to a source of power, via the adaptor 400;
(iii) pivot the container 100 to the upright position; and
(iv) actuate the compressor 300.

Furthermore, the apparatus lends itself to ready re-use. Once a container 100 is emptied, it can be readily released, as by un-screwing, from the connector assembly 600, to be readily removed from the case 1 and replaced by a new, filled container.

Figure 4:
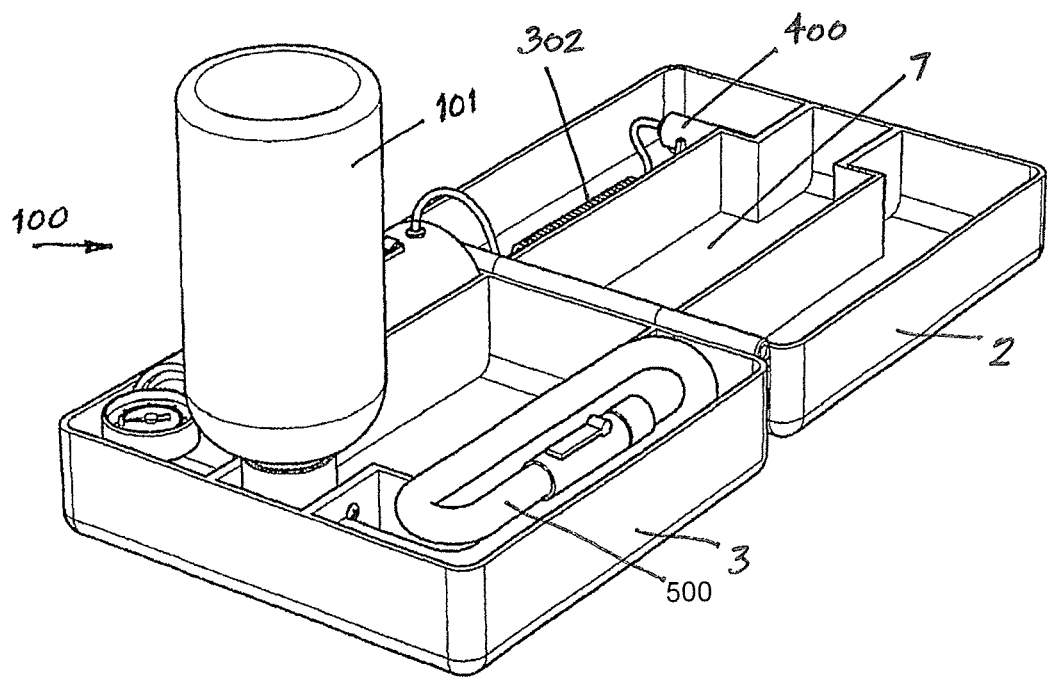
FIG. 4 is a top perspective view of the overall apparatus in accordance with the present invention, with the container for fluid, such as sealant composition in its operating/dispensing position/configuration.
Figure 5:
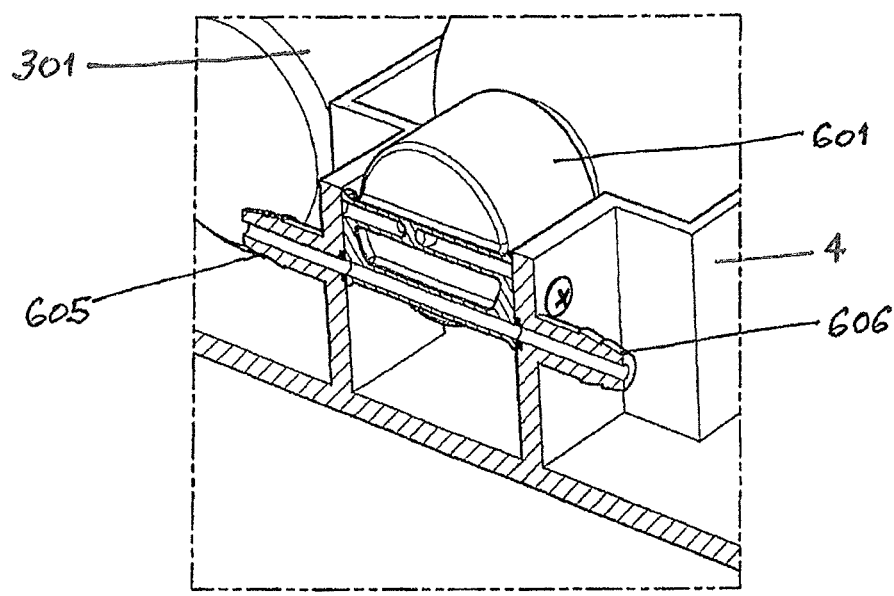
FIG. 5 is an enlarged sectional view of the top portion of the container for fluid as located in the casing of the apparatus in accordance with the present invention.
Figure 6:
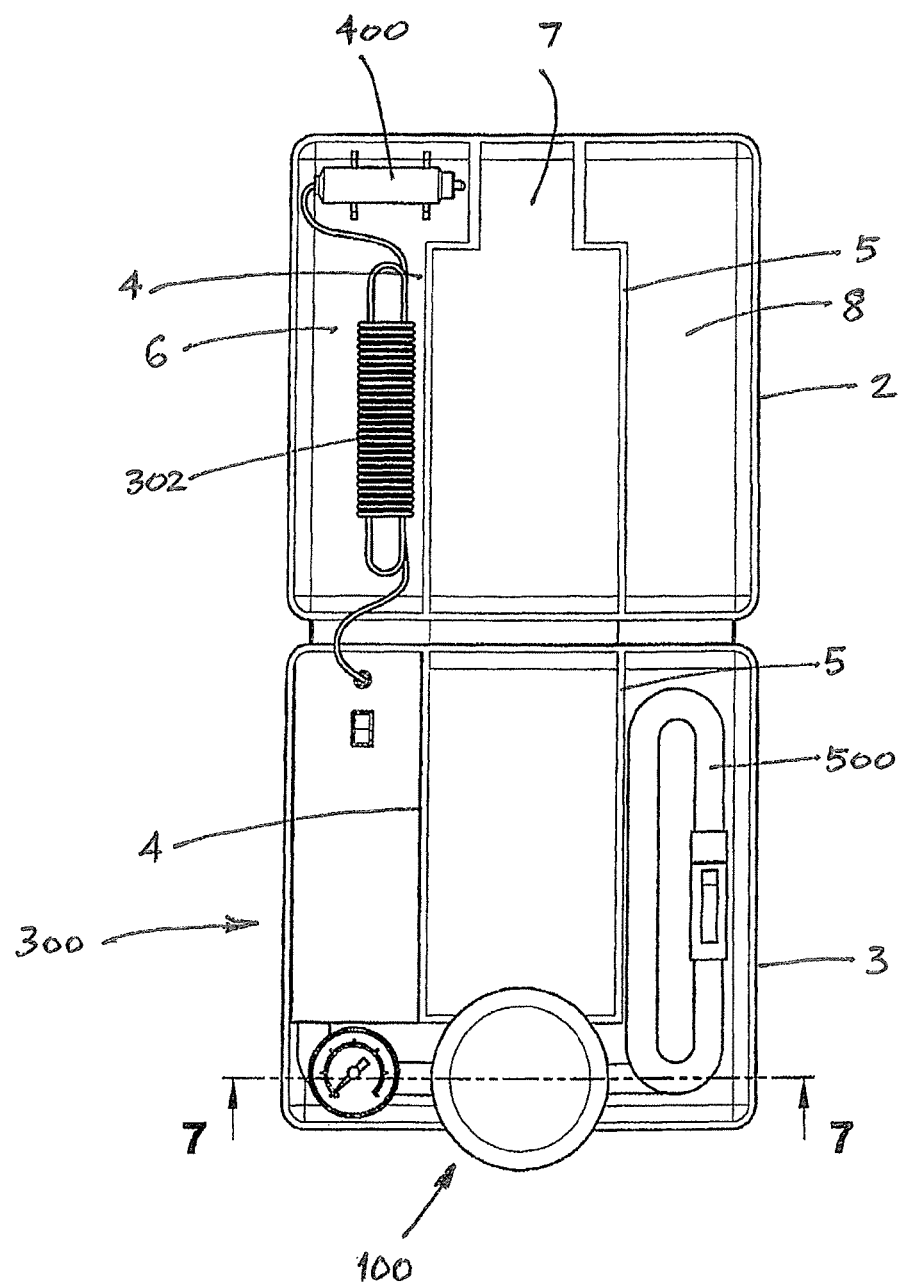
FIG. 6 is a view, similar to FIG. 4, from above showing the container in its upright dispensing position/configuration.

In accordance with an especially preferred embodiment the apparatus may include a means, as for example an electrical micro-contact switch of any suitable type (not shown), which serves to allow the compressor 300 to function, and thereby allow for discharge of sealant composition from the container 100, only where the container 100 for sealant composition is connected to the connector assembly 600, has been rotated to the second positon/configuration, such as the vertical position as shown in, for example FIG. 4 of the drawings.

This will remove the possibility of accidental or inadvertent discharge of sealant composition, which could otherwise take place when, for example, the compressor 300 is plugged in or in an electrical connection and/or in the instance of the connection on/off switch for the compressor 300 inadvertently or accidentally being moved permanently to the on position.

In some arrangements, when air only is required, as for example when the compressor is being used to re-inflate a tire, the hinged lid or top section 2 of the case 1 will activate the same micro-switch.

The apparatus in accordance with the invention preferably should include such a micro-switch, in the form of a "fail-safe" mechanism, to avoid the possibility of inadvertent discharge of sealant composition in the event that the air hose has not been connected at all, or not properly connected at least, to the tire valve before the compressor has been turned on. If such was to occur, the result would be that the container of sealant composition would be at best partially, and at worst fully, discharged by the time the user has realised the problem. Apart from the mess involved—which would need to be cleaned up—there would then be little, if any, sealant composition left to be used for sealing a deflated or damaged tire.

In an alternative arrangement, which is not shown in the drawings, the valve assembly could include, rather than the system of O-ring seals as previously described, a low cost seal of a known type, referenced to in this specification indirectly as aluminium induction seals. In such embodiments, as the container 100 is screwed into place relative to the valve/connector assembly, such an aluminium induction seal may be cut or screwed, or penetrated, by a small blade-like protrusion which could be formed as an integral part of the main body, thereby to overcome the sealing effect and allow for entry of air (generated by the compressor 300) into the container 100, to be mixed with the sealant composition for ultimate egress therefrom, via the nipple, into the hose 500 for delivery to the tire valve and tire.

In other alternative arrangements, such as the embodiments shown in FIGS. 17 to 24, the top section 2 of the case 1 can be split into two portions symmetrically or asymmetrically such that a first portion 2a of the top section 2 hinges open, relative to the bottom section 3, on a first side of the case 1. For example, the top section 2 can be split asymmetrically such that a first portion 2a of the top section 2 hinges open above the container 100 to allow access to the container 100 to allow progressive and selective movement of the container 100 between the first and second end positons/configurations and to allow replacement of the container 100.

In some preferred arrangements, a second portion 2b of the top section 2 is configured to not hinge open. In such arrangements, second portion 2b is attached to the bottom section 3 via one or more fasteners, such as clips or buckles, e.g. made of suitable plastics material. Configuring the second portion 2b of the top section 2 to not hinge open prevents users accessing the compressor 300 in normal use.

Figure 17:
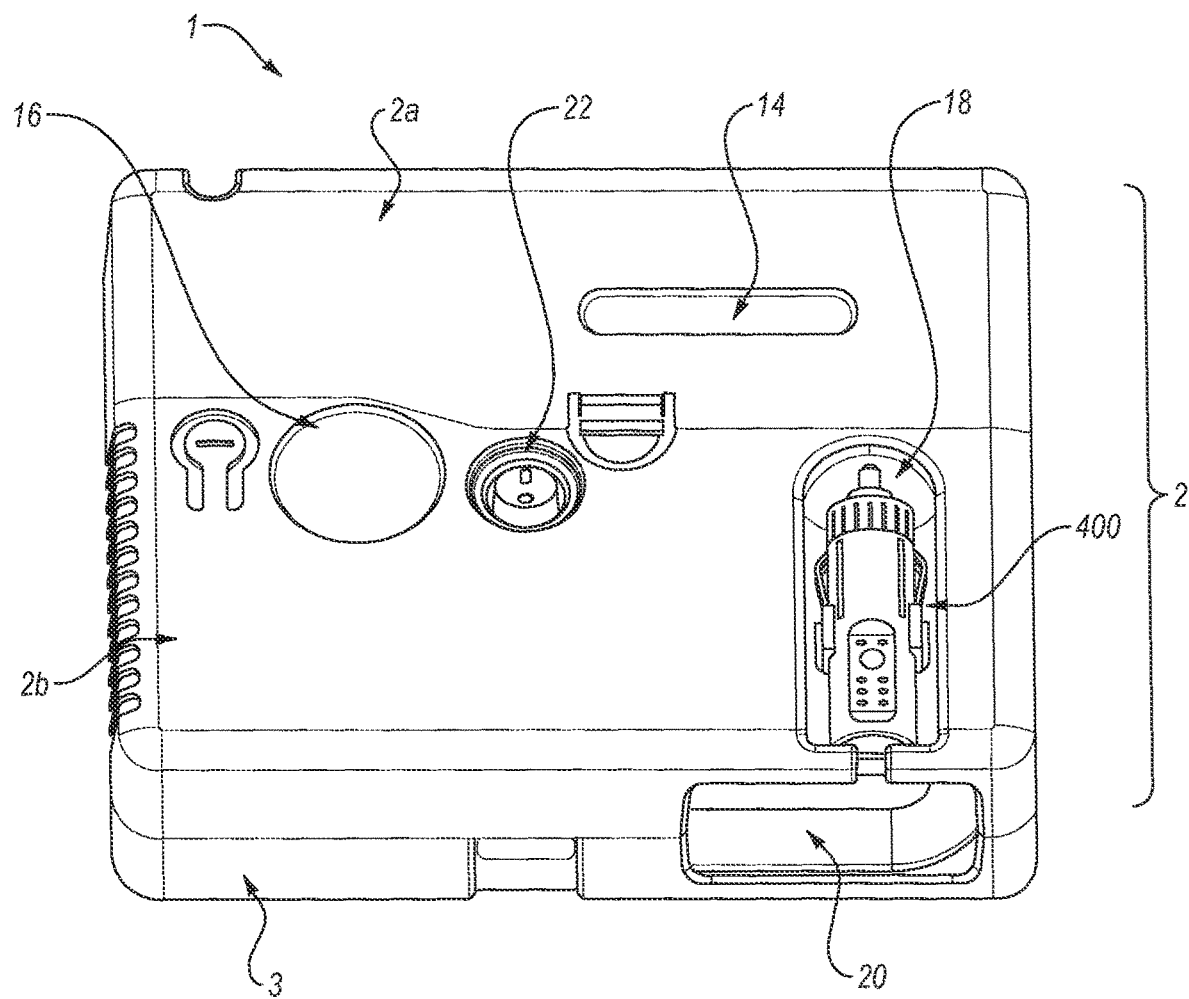
FIG. 17 is a top perspective view of an apparatus in accordance with another embodiment of the present invention, in its storage configuration.
Figures 17A, 17B:
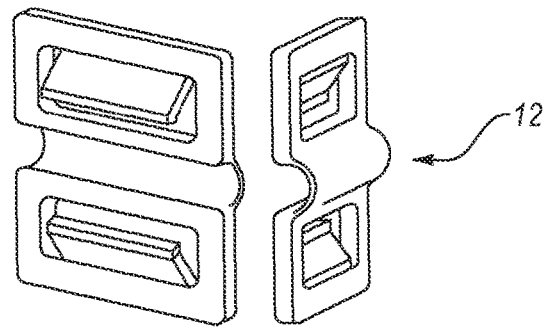
FIG. 17A is a front perspective view of a hinge for hingedly attaching together sections of the case of the apparatus shown in FIG. 17.
FIG. 17B is a rear perspective view of the hinge shown in FIG. 17A.

Examples of suitable hinges 12 for hingedly attaching one or more top sections 2a, 2b of the case to the bottom section 3 of the case of the apparatus are shown in FIGS. 17A and 17B. Hinges 12 are formed separately for coupling to apertures in one or more top sections 2a, 2b of the case and to apertures in the bottom section 3 of the case 1.

In such alternative arrangements, the first portion 2a of the top section 2 can comprise an aperture 14 through which the container 100 can be viewed whilst the first portion 2a of the top section 2 is still closed. It is therefore possible to view at a glance that the container 100 is present in the case 1. Where the container 100 is formed of a transparent material, it is also possible to view at a glance that the container 100 comprises a sufficient quantity of the sealant composition. The aperture 14 is preferably an elongate aperture aligned with a longitudinal axis of the container 100 such that a substantial middle to upper portion of the length of the container 100 can be viewed there through.

In such alternative arrangements, a second portion 2b of the top section 2 can comprise an aperture, such as a circular aperture 16, through which the pressure gauge 9 can be viewed whilst the second portion 2b of the top section 2 is still closed.

In such alternative arrangements, the second portion 2b of the top section 2 can comprise a cavity or recess 18 for receiving therein the adaptor 400 such that the apparatus can be easily and quickly connected to a power outlet without the need to retrieve the adaptor from inside the case 1. A side of the case 1 can comprise a cavity or recess 20 for storing the power cord or conduit coupled to the adaptor 400.

In such alternative arrangements, the second portion 2b of the top section 2 can comprise a cavity or recess 22 for accommodating the on/off switch 19 for the compressor 300. The recessed on/off switch 19 prevents the on/off switch from protruding from the case 1 thus minimising the likelihood of inadvertent activation. In this arrangement, the compressor 300 can be activated via the switch 19 without the need to open the case 1, for example, when the inflatable article needs to be inflated or re-inflated, but not repaired.

Figure 18:
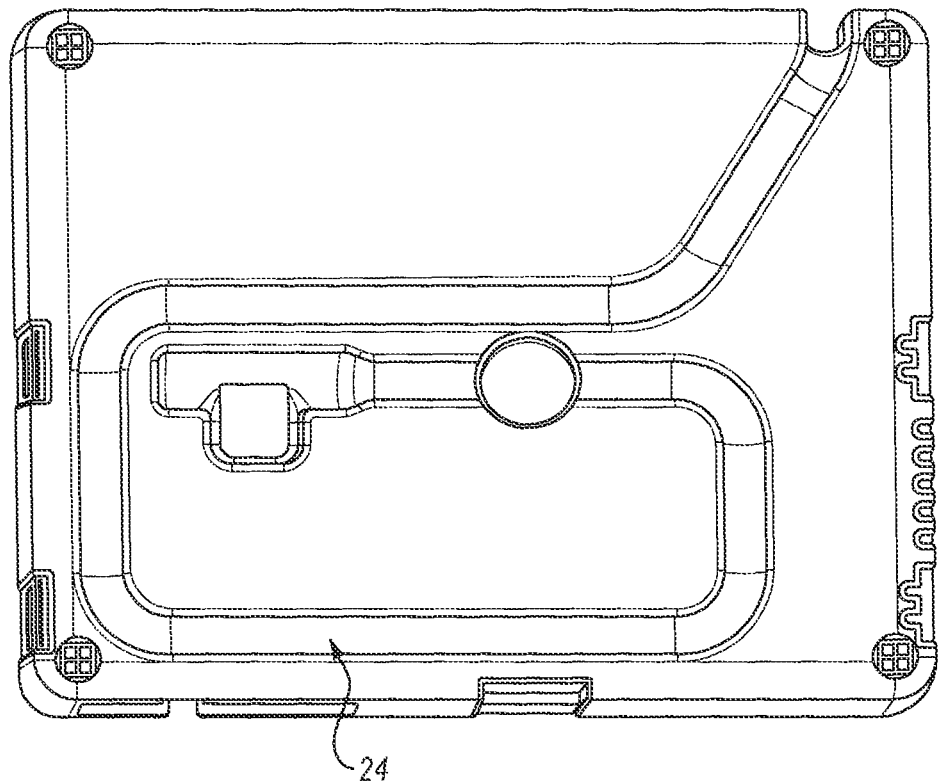
FIG. 18 is an underside view of the apparatus of FIG. 17 showing a recess for accommodating a hose for connection to a tire.

Referring to FIG. 18, the bottom section 3 of the case 1 comprises an elongate recess 24 for accommodating at least part of the hose 500 to be releasably connected to the inflatable article. Accommodating at least part of the hose in at least part of the case 1 assists in making the apparatus as compact as possible by avoiding the need to accommodate the hose inside the case 1 and in particular within a separate compartment inside the case. This arrangement also allows the hose 500 to be connected to the inflatable article without the need to open the case 1, for example, when the inflatable article needs to be inflated or re-inflated, but not repaired.

Figure 19:
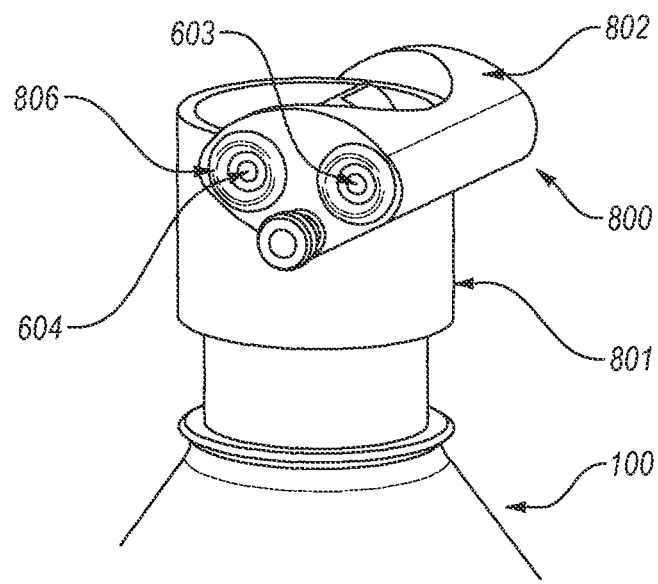
FIG. 19 is a top perspective view of an alternative embodiment of the connector assembly and valve assembly in a position connected to the container.
Figure 20:
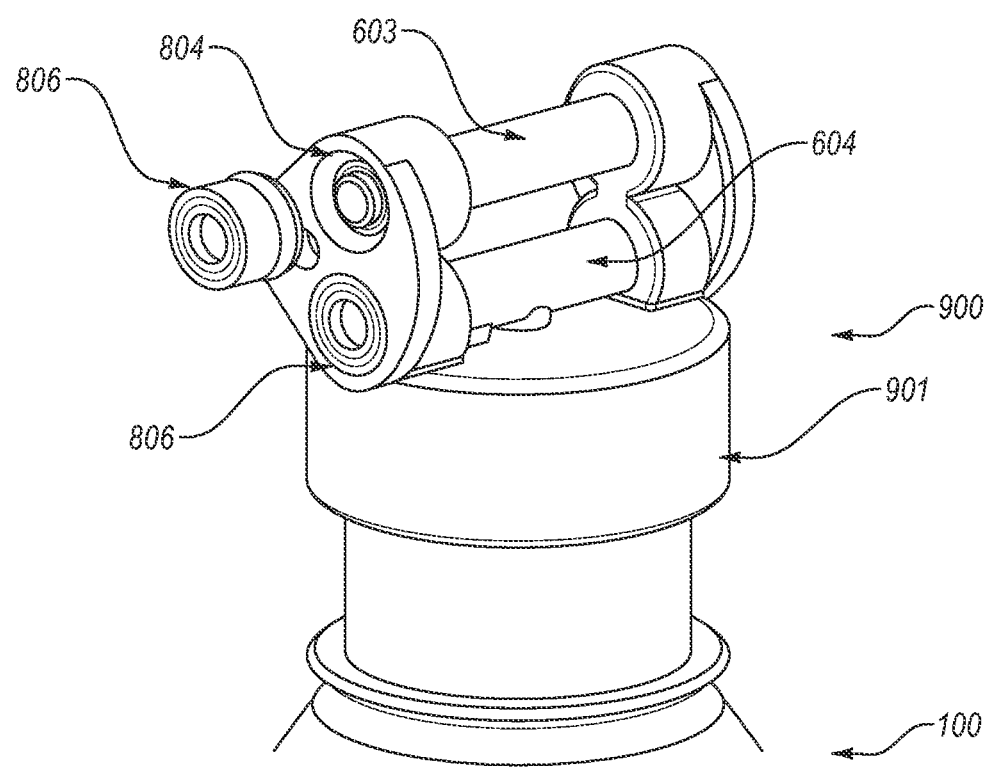
FIG. 20 is a top perspective view of a further embodiment of the connector assembly and valve assembly in a position connected to the container.
Figure 24:
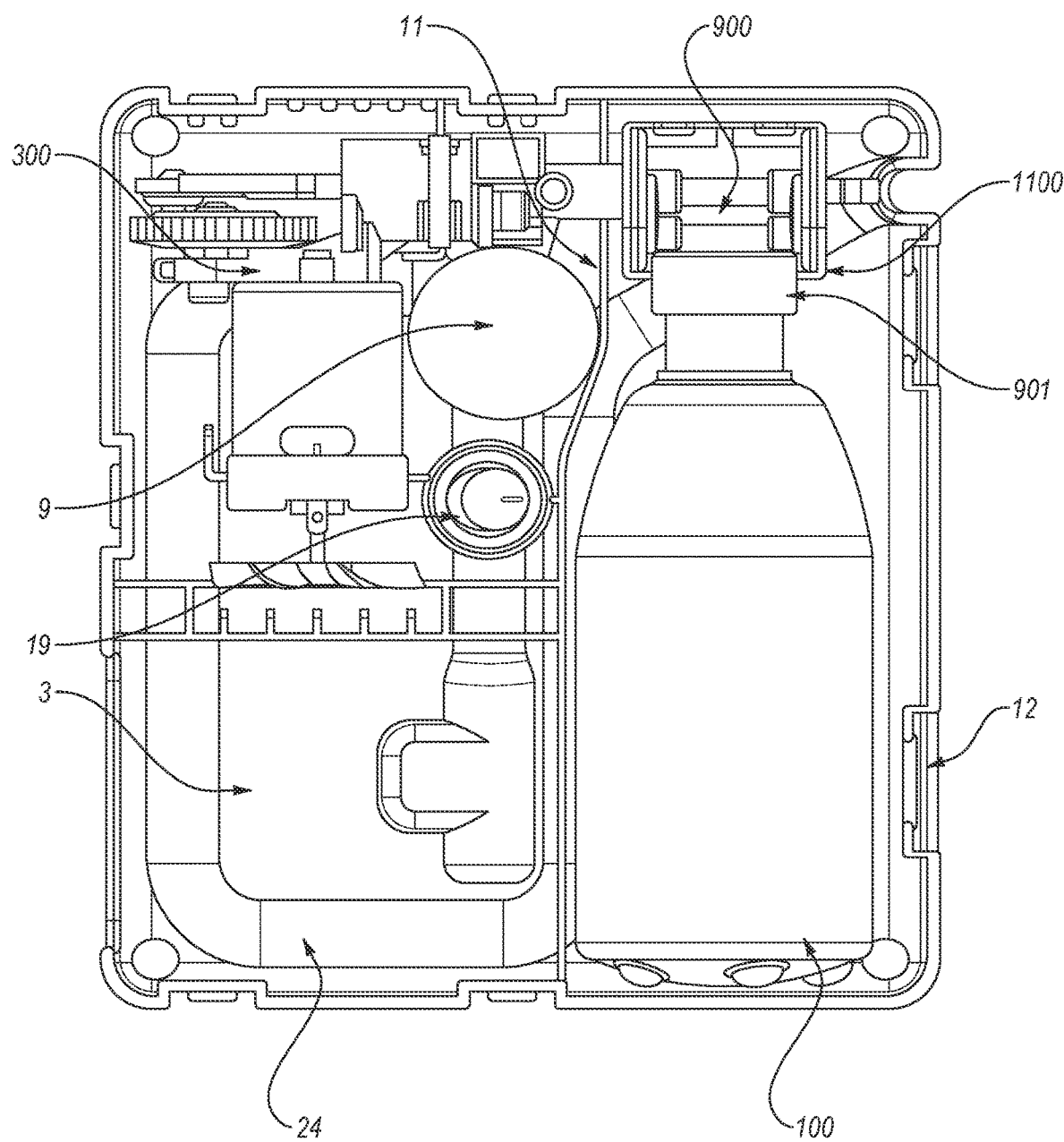
FIG. 24 is a top view of the apparatus shown in FIG. 17 with a top section of the case removed showing the contents of the apparatus in its storage configuration.

FIGS. 19 and 20 show alternative embodiments of the connector assembly 800, 900 and valve assembly in a position connected to the neck portion of the container 100. Connector assembly 800 includes a main body 801 and a housing or casing 802 at least partially surrounding transverse first and second hollow tubes 603, 604 associated with the closed end of the connector assembly 800. Connector assembly 900 includes a smaller main body 901 compared with other embodiments described herein and omits the housing or casing 802 resulting in a smaller and lighter connector assembly that requires less material to produce. Moreover, for connector assembly 900, transverse first and second hollow tubes 603, 604 are aligned vertically, or substantially vertically and spaced apart vertically, or substantially vertically relative to the main body 901. As shown in FIG. 24, when connector assembly 900 is connected to the container 100 and pivotally coupled to the case 1, for example via cradle 1100 described below, the container 100 is accommodated closely to the bottom section 3 of the case 1 when the container 100 is in the first position/configuration. Connector assembly 900 thus assists in making the apparatus as compact as possible.

Figure 23:
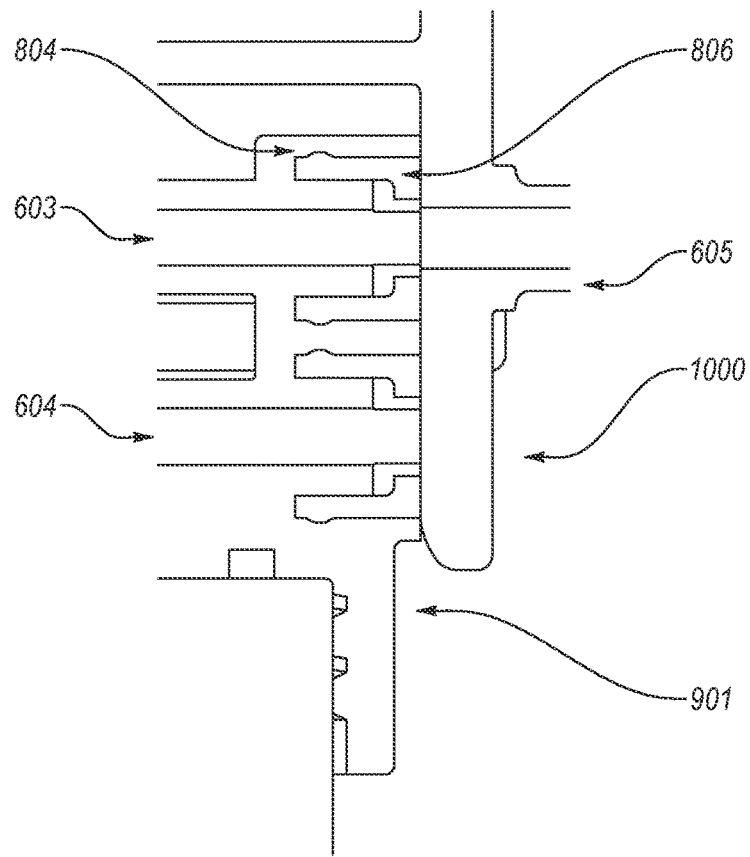
FIG. 23 is a sectional view of part of the connector assembly and valve assembly shown in FIG. 20 accommodated by the cradle shown in FIG. 22.

With additional reference to FIG. 23, each connector assembly 800, 900 comprises circular recesses 804 at the ends of the transverse first and second hollow tubes 603, 604 to accommodate seals 806. In use, air pressure pushes the seals 806 into the respective recesses 804 of the valve assembly providing an improved seal.

Figure 21:
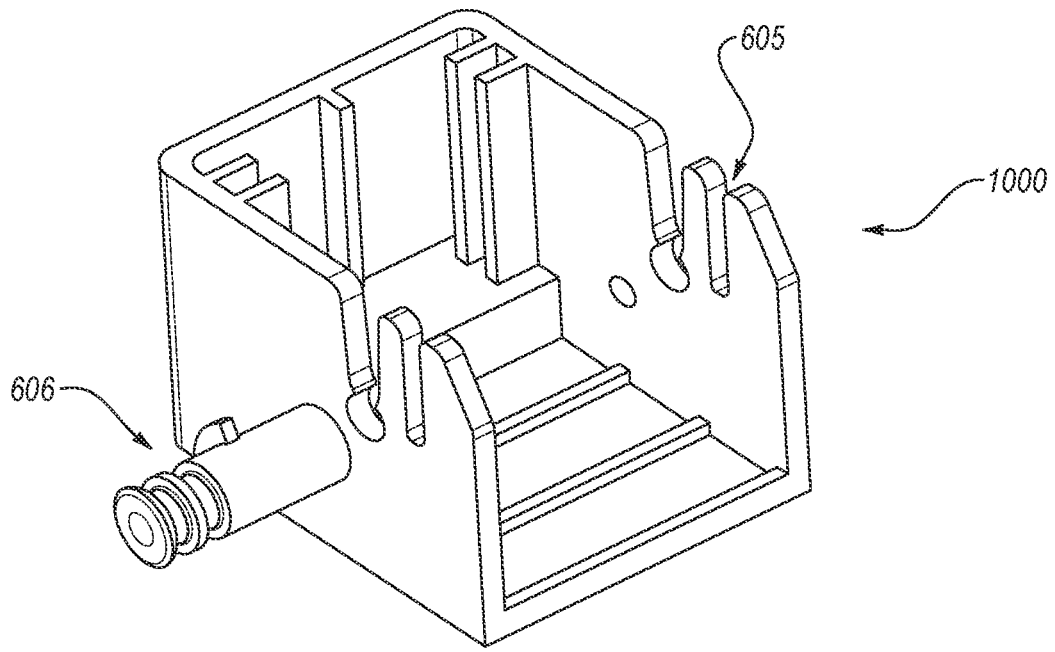
FIG. 21 is a top perspective view of a cradle for accommodating the connector assembly and valve assembly in a pivoting or hinging manner.
Figure 22:
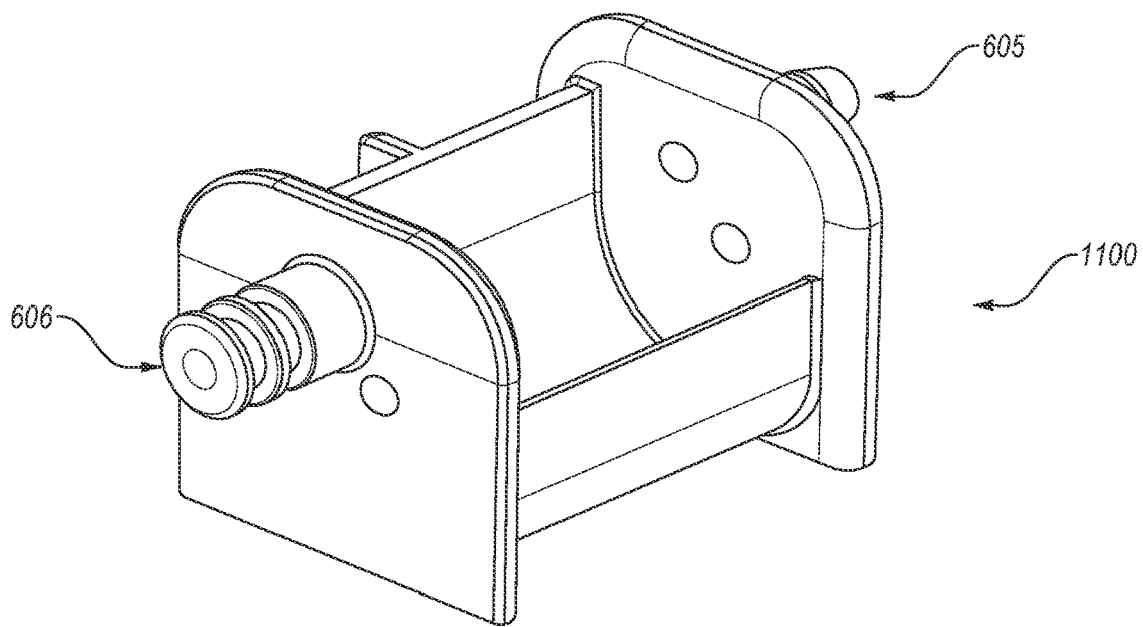
FIG. 22 is a top perspective view of a cradle for accommodating the connector assembly and valve assembly in a pivoting or hinging manner.

Referring to FIGS. 21 and 22, in alternative arrangements or embodiments, the portion of lesser width of the case 1 for accommodating the connector assembly in a pivoting or hinging manner is in the form of a cradle 1000 or cradle 1100 formed integrally with the bottom section 3 of the case 1 or formed separately and attached to the bottom section 3 of the case 1 by any suitable means. Cradles 1000, 1100 each comprise first nipple 605 allowing for releasable connection to the hose 500, in turn to be releasably connected to said inflatable article, and a second nipple 606 for allowing for releasable connection to the compressor assembly. In this arrangement, the compressor assembly and the hose are releasably connected on opposite sides to the arrangement shown in FIGS. 1 to 16 herein.

The plan view shown in FIG. 24 of an alternative arrangement of the apparatus of the present invention illustrates the compact arrangement of the components of the apparatus within and about the case 1, including the accommodation of at least part of the hose 500 in the recess 24 in an external face of the bottom section 3 of the case and the adaptor 400 and cord in recesses 18 and 20 in the case 1 respectively. In this arrangement, connection of the hose 500 to the inflatable article, such as a vehicle tire, and inflation of the tire can be achieved without the need to open the case 1 by virtue of external mounting of the hose 500 and external access of the switch 19. Opening of section 2a of the top section 2 allows for convenient access to the container 100 to move the container between the first and second positions/configurations to allow for discharge of sealant composition from the container 100 to repair and inflate the tire. Section 2b can remain closed during this time, thus preventing access to the compressor assembly 300 during use. Access to the compressor assembly 300 when section 21 is open is also prevented by divider 11. Shaped container 301 of other embodiments described herein is therefore not required, thus simplifying construction and reducing weight of the apparatus.

The reference to any prior art in this specification is not, and should not be taken as, an acknowledgement or any form of suggestion that the prior art forms part of the common general knowledge.

Finally it should be understood that the foregoing description refers merely to preferred embodiments of the invention and that their relation to modifications would be possible thereto without departing from the spirit and scope of the invention, ambit of which is to be determined from the following claims.

What is claimed is:

1. An apparatus for repairing and/or inflating a damaged and/or deflated inflatable article, said apparatus including:

a container for receiving and retaining for dispensing, a sealant composition; and a compressor assembly which is releasably connectable to said container;

wherein said container has associated therewith a valve assembly which allows for controlled dispensing of said sealant composition from said container to said damaged and/or deflated inflatable article; and wherein said container is progressively and selectively movable between respective first and second positions/configurations, said first position/configuration when said container is disposed substantially parallel to said compressor assembly, and said second position/configuration when said container is disposed at substantially right angles to said compressor assembly, said first and second positions/configurations corresponding to storage and dispensing positions respectively for said sealant composition from said container;

wherein said valve assembly has associated therewith a connector assembly including a pivoting or hinging member having a first hollow tube and a second hollow tube associated therewith and extending transversely of a closed end of said connector assembly;

wherein actuation of said compressor when said container is in said first position/configuration allows air flow through the first hollow tube for inflation or re-inflation of said inflatable article; and wherein actuation of said compressor when said container is in said second position/configuration allows air flow through said second hollow tube for dispensing a mixture of air and sealant composition from said container to said inflatable article.

2. The apparatus as claimed in claim 1, wherein said container includes a main body portion which is closed at one end and has a neck portion extending substantially normally from the other, open end thereof, said neck portion of said container being adapted, in use, to receive and releasably retain said valve assembly.

3. The apparatus as claimed in claim 2, wherein said valve assembly is releasably disposed within said neck portion of said container and is adapted to be in flow connection with said compressor assembly.

4. The apparatus as claimed in claim 3, wherein said valve assembly includes a main body adapted to be releasably connected to said neck portion of said container.

5. The apparatus as claimed in claim 2, wherein a connector assembly associated with said valve assembly includes a main body adapted to be releasably connected to said neck portion of said container.

6. The apparatus as claimed claim 5, wherein said main body of the valve assembly includes a plurality of threads of a complimentary shape to a plurality of threads on said neck portion of said container, extending along at least part of an axial dimension thereof.

7. The apparatus as claimed in claim 5, wherein said main body of said connector assembly includes a first passageway extending axially thereof, said first passageway terminating, at one end, with means allowing for releasable connection to said compressor assembly.

8. The apparatus as claimed in claim 7, wherein said connector assembly includes a second passageway, in use to be in flow connection with a lateral, substantially tubular extension of said main body of said connector assembly, wherein said lateral extension includes means allowing for releasable connection to a hose, in turn to be releasably connected to said inflatable article.

9. The apparatus as claimed in claim 8, wherein actuation of said compressor assembly when said container is in said second position/configuration allows air flow through said first and second passageways for dispensing a mixture of air and sealant composition from said container to said inflatable article.

10. The apparatus as claimed in claim 5, wherein said main body of the valve assembly includes shaped indents or grooves each adapted to receive and releasably retain therewithin a sealing means.

11. The apparatus as claimed in claim 4, wherein said main body of the valve assembly includes shaped indents or grooves each adapted to receive and releasably retain therewithin a sealing means.

12. The apparatus as claimed in claim 4, including a hollow member protruding substantially normally from an upper face of said main body of the valve assembly which is sealed at its uppermost end by a sealing means.

13. The apparatus as claimed in claim 12, wherein said hollow member forms part of a shaped insert interposed between said valve assembly and said neck portion of said container.

14. The apparatus as claimed in claim 13, wherein said main body of the valve assembly has extending there through, and substantially centrally thereof, a passage in flow connection with said hollow member.

15. The apparatus as claimed in claim 1, including a pair of nipples extending laterally from opposed sides of respective dividers of a case for housing said apparatus, a first of said pair of nipples allowing for releasable connection to said compressor assembly and a second of said pair of nipples allowing for releasable connection to a hose, in turn to be releasably connected to said inflatable article.

16. The apparatus as claimed in claim 1, including a switch, the activation of said switch allows said compressor assembly to function, and thereby allow for discharge of sealant composition from said container, only where said container is in said second position/configuration.

17. The apparatus as claimed in claim 16, wherein the said switch is activated by opening a hinged lid of a case housing the apparatus moving said container to said second position/configuration.

18. The apparatus as claimed in claim 1, wherein said valve assembly includes an aluminium induction seal.

19. The apparatus as claimed in claim 1, wherein said compressor assembly has associated therewith connection means allowing for connection to a source of power, said connection means being in the form of a retractable cord or power conduit, said cord or conduit having, at one end thereof, adaptor means allowing for connection to a source of electrical energy/power.

20. A kit for repairing and/or inflating a damaged and/or deflated inflatable article, said kit including:

a container for receiving and retaining for dispensing, a sealant composition; and a compressor assembly which is releasably connectable to said container;

wherein said container has associated therewith a valve assembly which allows for controlled dispensing of said sealant composition from said container to said damaged and/or deflated inflatable article; and wherein said container is progressively and selectively movable between respective first and second positions/configurations, said first position/configuration when said container is disposed substantially parallel to said compressor assembly, and said second position/configuration when said container is disposed at substantially right angles to said compressor assembly, said first and second positions/configurations corresponding to storage and dispensing positions respectively for said sealant composition from said container;

wherein said valve assembly has associated therewith a connector assembly including a pivoting or hinging member having a first hollow tube and a second hollow tube associated therewith and extending transversely of a closed end of said connector assembly;

wherein actuation of said compressor when said container is in said first position/configuration allows air flow through the first hollow tube for inflation or re-inflation of said inflatable article; and wherein actuation of said compressor when said container is in said second position/configuration allows air flow through said second hollow tube for dispensing a mixture of air and sealant composition from said container to said inflatable article.

21. The kit as claimed in claim 20, including a case for housing said container and said compressor assembly, said case comprising a top section hingedly connected to a bottom section.

22. The kit as claimed in claim 21, wherein said top section comprises one or more of the following: a) an aperture through which said first container can be viewed; an aperture through which a pressure gauge can be viewed; a recess for accommodating an on/off switch for said compressor assembly.

23. The kit as claimed in claim 21, wherein said top section of said case is split into at least two portions, at least one of said two portions of said top section hingedly connected to said bottom section and openable above said first container to allow access to said container.

24. The kit as claimed in claim 21, wherein said bottom section of said case comprises a recess for accommodating at least part of a hose to be releasably connected to said inflatable article.

25. The kit as claimed in claim 20, wherein said top section comprises a cavity or recess for receiving therein an adaptor means of a connection means allowing for connection to a source of power.

26. The kit as claimed in claim 20, including a cradle having a pair of nipples allowing for releasable connection to said compressor assembly and for releasable connection to a hose, in turn to be releasably connected to said inflatable article.

27. The kit as claimed in claim 20, wherein a connector assembly associated with said valve assembly includes a main body adapted to be releasably connected to a neck portion of said container, said connector assembly including a first hollow tube and a second hollow tube extending transversely of a closed end of said connector assembly, said first and second hollow tubes aligned vertically, or substantially vertically and spaced apart vertically, or substantially vertically, relative to the main body.

* * * * *